United States Patent Office 3,321,530
Patented May 23, 1967

3,321,530
3,4-DIHYDRO-2,5-DIMETHOXYNAPHTHALENE
William A. Bolhofer, Frederick, Pa., assignor to Merck & Co., Inc., Rahway, N.J., a corporation of New Jersey
No Drawing. Filed June 28, 1963, Ser. No. 291,249
1 Claim. (Cl. 260—613)

This invention is concerned with the preparation of a novel compound which is a useful intermediate in the process for preparing alkoxy-naphthonitrile compounds from commercially available starting materials. The alkoxy-naphthonitriles are useful intermediates for the preparation of (α-alkylideneacyl)naphthyloxyacetic acid compounds, diuretic agents described and claimed in my joint application, Ser. No. 152,137, filed Nov. 14, 1961, and now abandoned.

While many alkoxy-naphthonitrile compounds, and, in particular, 5-methoxy-2-naphthonitrile, are known compounds, many of them are not commercially available and in order to use them as intermediates in the preparation of the (α-alkylideneacyl)naphthyloxyacetic acid compounds of the above application, they must be prepared from products which are commercially available. One method described in the prior literature teaches that 5-methoxy-2-naphthonitriles and other related alkoxy-naphthonitriles can be made from commercially available β-aminonaphthalene [J. Jacques, Bul. Soc. Chim., France, page 857 (1953)]. This method, however, is undesirable for several reasons. In particular, as the commercially available β-aminonaphthalene used as a starting material in this process, is known to be an active carcinogen, use of which is barred by law in certain states, the use of this process, particularly on a commercial scale, should be avoided because of the hazards to which the manufacturing people would be exposed. Another important disadvantage involved in the use of the process described by Jacques from a preparative standpoint resides in the fact that the β-aminonaphthalene compound must be sulfonated to form the corresponding sulfonic acid derivative. During the sulfonation step, four position isomers of the sulfonic acid derivative are formed which then need to be separated before proceeding with the preparation of the particular alkoxy-naphthonitrile desired. Because of the need for separating the isomers and also because of the limited yield of each isomer resulting therefrom, commercial production by this process would be time-consuming and costly in addition to being hazardous on account of the toxic properties of the starting material.

As the process described by Jacques for the preparation of alkoxy-naphthonitriles is not desirable for commercial manufacturing purposes, applicant devised a novel method which avoids the formation of any position isomers and which employs a commercially available starting material, which, to the best of applicant's knowledge and belief, is relatively physiologically innocuous. In addition, applicant discovered as a special feature of this invention that under controlled conditions the novel product, 3,4-dihydro-2,5-dimethoxynaphthalene, could be prepared from said commercially available starting material.

The process devised by applicant can be used commercially to prepare alkoxy-naphthonitriles or similar products having additional substituents attached to the naphthalene nucleus, particularly one or more substituents selected from lower alkyl substituents attached to the naphthalene nucleus, and in particular it can be used to prepare 5-alkoxy-2-naphthonitriles which are either unsubstituted or additionally substituted as hereinbefore described.

The following reaction scheme illustrates the novel method of this invention

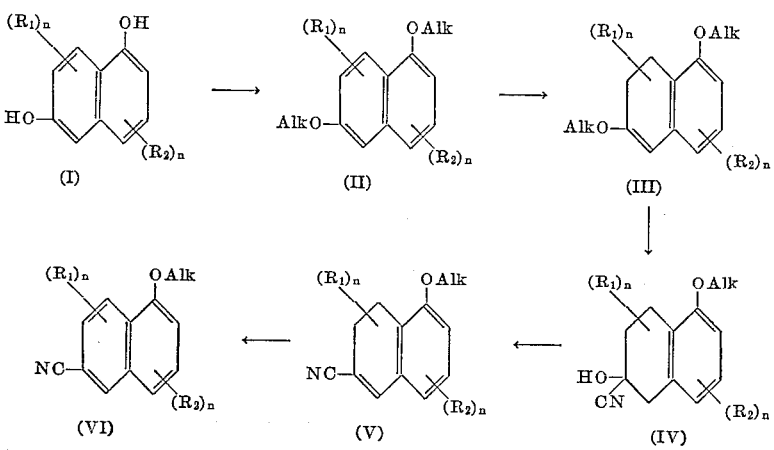

The preparation of 1,6-dimethoxynaphthalene (II) from 1,6-naphthalenediol (I) is described by J. W. Cornforth et al., J. Chem. Soc. 1855 (1949), especially at page 1861. While the preparation of substance (II) does not form part of the claimed invention, a discussion of it is incorporated to illustrate the preparation of the novel compound (III) from a commercially available starting material. The preparation of 3,4-dihydro-2,5-dimethoxynaphthalene (III) is accomplished by alkylation (for example with methylsulfate or other known alkylating agents) of 1,6 - naphthalenediol and the 1,6 - dialkoxynaphthalene compound (II) thus obtained then is reduced with an alkali metal, especially sodium or calcium and the like, and alcohol followed by a proper workup which is critical in the preparation of compound III. In particular, the method can be carried out by adding an alkylsulfate to a mixture of 1,6-naphthalenediol in 2 N sodium hydroxide. Additional quantities of the alkylsulfate and sodium hydroxide can be added after the initial reaction has subsided in order to bring the reaction to completion and to increase the yield. The 1,6-dialkoxy-naphthalene compound thus obtained then is dissolved in boiling ethyl alcohol and metallic sodium or calcium is added to the refluxing mixture. After all the sodium is dissolved, the product is extracted into an organic solvent, such as benzene and the alcohol is removed by addition of water and dilute acid. The 3,4-dihydro-2,5-dimethoxynaphthalene (III) then can be separated by distillation. Acids such as dilute mineral or organic acids can be used in the extraction procedure, especially dilute hydrochloric acid, sulfuric acid, acetic acid and the like. Other dihydro-dimethoxynaphthalenes can be prepared by this method using the proper dihydroxynaphthalene starting materials.

Product III then is converted to product VI by initially adding hydrogen cyanide to the dihydro-dimethoxynaphthalene compound (III). The reaction advantageously is carried out with cooling followed by slight warming at between about 20–25° C.

Dehydration of the tetralone cyanohydrin (IV) thus formed, advantageously with a nitrogenous base such as pyridine, picoline and the like, in the presence of a chlorinating agent, as phosphorus oxychloride, phosphorus trichloride or thionyl chloride and advantageously with cooling gives the dihydronaphthonitrile (V).

Aromatization of V by dehydrogenation with sulfur or selenium advantageously with heating at a temperature between about 175–250° C., gives the desired alkoxynaphthonitrile (VI). The dehydrogenation can, if desired, be catalyzed with a metal such as zinc powder or dust or other suitable metal catalyst.

The following examples describe the above process in more detail.

EXAMPLE 1

3,4-dihydro-2,5-dimethoxynaphthalene 1,6-dimethoxynaphthalene (231 g., 1.23 moles) and 1,900 ml. of absolute ethanol are placed in a 5-liter, three-necked flask fitted with an efficient reflux condenser and a stirrer. Sodium (190 g., 8.3 moles) in the form of one-quarter inch spheres is added over a 35-minute period. An external cooling bath of Dry Ice and hexane is raised around the flask when necessary to control the vigorous reaction. The sodium is completely reacted about 20 minutes after the addition and stirring is continued for an additional 15 minutes. One liter of water and 1 liter of benzene are added, the mixture transferred to a separatory funnel and the lower aqueous phase discarded. An additional 1 liter of water and 1 liter of bezene are added. The lower aqueous phase is removed and extracted with 500 ml. of benzene. The benzene solutions are combined and extracted twice with 1 liter portions of cold 0.1 N hydrochloric acid and twice with 1 liter of water. Concentration of the benzene solution yielded crude 3,4-dihydro-2,5-dimethoxynaphthalene as an oil. Distillation at 1.2 mm. yielded pure product boiling at 127° C. with $n_D^{25}$ of 1.5830.

The above process can be employed to prepare other 3,4-dihydro-2,5-dialkoxynaphthalene compounds whether unsubstituted or having one or more substituents, particularly lower alkyl substituent(s), attached to the naphthalene nucleus.

The following example illustrates the procedures by which the novel 3,4-dihydroxy-2,5-dimethoxy- (or other dialkoxy)naphthalene can be converted to the desired alkoxy-naphthonitriles.

EXAMPLE 2

5-methoxy-2-naphthonitrile

STEP A.—PREPARATION OF 1,2,3,4-TETRAHYDRO-2-HYDROXY-5-METHOXY-2-NAPHTHONITRILE

Sodium cyanide (64 g., 1.31 moles) is added to a well-stirred mixture of 110 g. (0.58 mole) of 3,4-dihydro-2,5-dimethoxynaphthalene, 110 ml. of water and 65 ml. of ether at 0° C. Concentrated hydrochloric acid (117 ml.) is added to the mixture over a 65 min. period while holding the temperature below 10° C. with external cooling. Stirring is maintained for 2.5 hours at 5° C. and then at 20–25° C. for 16 hours. The organic layer is separated and the water layer extracted with ether. The extract and organic layer are combined, extracted with water and concentrated under reduced pressure to yield an oil. Addition of isopropyl ether induces crystallization and 59% of 1,2,3,4-tetrahydro-2-hydroxy-5-methoxy-2-naphthonitrile is obtained, M.P. 90–98° C. Recrystallization from butyl chloride yields white crystals melting at 104–106° C.

*Analysis.*—Calculated for $C_{12}H_{13}NO_2$: C, 70.91; H, 6.45; N, 6.89. Found: C, 71.28; H, 6.53; N, 7.02.

STEP B.—PREPARATION OF 3,4-DIHYDRO-5-METHOXY-2-NAPHTHONITRILE

A well-stirred solution of 51.5 g. (0.254 mole) of 1,2,3,4 - tetrahydro-2-hydroxy-5-methoxy-2-naphthonitrile (M.P. 90–98° C.) in 200 ml. of pyridine is cooled to −3° C. and 77.7 g. (0.5 mole) of phosphorus oxychloride added over a 35 minute period. The mixture is stirred for 3 hrs. at −3–0° C., 16 hrs. at 20–25° C. and 1 hr. at 80–85° C. It then is poured into a mixture of 1 kg. of ice and 85 ml. of concentrated hydrochloric acid. The crystalline product is collected, washed with water and dried. Distillation at 140° C. and 0.2 mm. yields 46.2 g. of distillate (98% of theory) which melts at 40–45° C. Recrystallization from isopropyl alcohol raises the M.P. to 55–65° C.

*Analysis.*—Calculated for $C_{12}H_{11}NO$: C, 77.81; H, 5.99; N, 7.56. Found: C, 77.69; H, 5.86; N, 7.74.

STEP C.—PREPARATION OF 5-METHOXY-2-NAPHTHONITRILE

A mixture of 30.0 g. of 3,4-dihydro-5-methoxy-2-naphthonitrile (M.P. 40–45° C.) and 5.7 g. of sulfur is heated at 200–210° C. for 10 minutes, 1.0 g. of zinc dust is added and the mixture heated an additional 10 minutes. The hot melt is poured into 1.2 liters of boiling hexane and the solution filtered. On cooling, the filtrate yields 18.5 g. (62%) of 5-methoxy-2-naphthonitrile. Recrystallization from hexane gives product melting at 70–72° C. (reported by J. Jacques, supra, M.P. 76–77° C.).

EXAMPLE 3

3,4-Dihydro-2,5-diethoxy-1-methylnaphthalene 1-methyl-2,5-naphthalenediol is alkylated with ethylsulfate to form 2,5-diethoxy-1-methylnaphthalene by substantially the same procedure described by Cornforth et al., supra. This product then is reduced with metallic sodium in alcohol followed by treatment by substantially the same methods described in Example 1 to give 3,4-dihydro-2,5-diethoxy-1-methylnaphthalene.

This product then can be converted by substantially the same procedures described in Example 2, Steps A through C to yield 5-ethoxy-1-methyl-2-naphthonitrile.

EXAMPLE 4

3,4-dihydro-2,5-dimethoxy-8-methylnaphthalene 8-methyl-2,5-naphthalenediol is alkylated with methylsulfate to form 2,5-dimethoxy-8-methylnaphthalene by substantially the same procedure described by Cornforth et al., supra. This product then is reduced with metallic sodium in alcohol followed by treatment by substantially the same methods described in Example 1 to give 3,4-dihydro-2,5-dimethoxy-8-methylnaphthalene.

This product then can be converted by substantially the same methods described in Example 1, Steps A through C to yield 5-methoxy-8-methyl-2-naphthonitrile.

EXAMPLE 5

3,4-dihydro-2,5-dimethoxy-1,8-dimethylnaphthalene 1,8-dimethyl-2,5-naphthalenediol is alkylated with methylsulfate to form 2,5-dimethoxy-1,8-dimethylnaphthalene by substantially the same procedure described by Cornforth et al., supra. This product then is reduced with metallic sodium in alcohol followed by treatment by substantially the same methods described in Example 1 to give 3,4-dihydro-2,5-dimethoxy-1,8-dimethylnaphthalene.

This product then can be converted by substantially the same methods described in Example 2, Steps A through C, to yield 5-methoxy-1,8-dimethyl-2-naphthonitrile.

EXAMPLE 6

*3,4-dihydro-2,5-dimethoxy-1,6-dimethylnaphthalene*

1,6-dimethyl-2,5-naphthalenediol is alkylated with methylsulfate to form 2,5-dimethoxy-1,6-dimethylnaphthalene by substantially the same procedure described by Cornforth et al., supra. This product then is reduced with metallic sodium in alcohol followed by treatment by substantially the same methods described in Example 1 to give 3,4-dihydro-2,5-dimethoxy-1,6-dimethylnaphthalene.

This product then is converted by substantially the same procedures described in Example 2, Steps A through C, to yield 5-methoxy-1,6-dimethyl-2-naphthonitrile.

While the invention has been described by means of the above specific examples, it is to be understood that it is not limited to the specific starting materials employed therein or to the specific reactants and/or reaction conditions used, but is to be understood to include variations and modifications thereof falling within the scope of the generic discussion of the invention and within the scope of the appended claim.

What is claimed is:

3,4-dihydro-2,5-dimethoxynaphthalene.

References Cited by the Examiner

Elsevier's Encyclopedia of Chemistry, Series III, vol. 12B, "Naphthalene Hydroxy Compounds," page 20007.

BERNARD HELFIN, *Acting Primary Examiner.*